(12) United States Patent
Steininger et al.

(10) Patent No.: US 6,311,761 B1
(45) Date of Patent: Nov. 6, 2001

(54) PLUNGER TIP FOR DIE CASTING APPARATUS

(76) Inventors: Ronald G. Steininger, 169 Dew Ct., St. Peters, MO (US) 63376; James Eric Justis, 23399 Franklin Rd., Lebanon, MO (US) 65536

( * ) Notice: Subject to any disclaimer, the term of this patent is extended or adjusted under 35 U.S.C. 154(b) by 0 days.

(21) Appl. No.: 09/470,406

(22) Filed: Dec. 22, 1999

(51) Int. Cl.[7] .................................................. B22D 17/08
(52) U.S. Cl. .......................... 164/312; 164/314; 92/187
(58) Field of Search .................... 164/312, 314; 92/187

(56) References Cited

U.S. PATENT DOCUMENTS

| 4,154,288 | 5/1979 | Borgen | 164/314 |
|---|---|---|---|
| 4,311,185 | 1/1982 | Zimmerman | 164/315 |
| 4,334,575 | 6/1982 | Miki et al. | 164/113 |
| 4,459,900 | * 7/1984 | LaBouff | 92/189 |
| 4,598,762 | 7/1986 | Glas | 164/312 |
| 4,667,729 | 5/1987 | Zecman | 164/312 |
| 4,754,799 | 7/1988 | Robinson | 164/113 |
| 4,842,039 | 6/1989 | Kelm | 164/312 |
| 4,886,107 | 12/1989 | Zecman | 164/113 |
| 4,899,804 | 2/1990 | Hammerer | 164/312 |
| 5,076,344 | 12/1991 | Fields et al. | 164/457 |
| 5,370,171 | 12/1994 | Fields et al. | 164/312 |

FOREIGN PATENT DOCUMENTS

| 2-46961 | * 2/1990 | (JP) | 164/312 |

* cited by examiner

Primary Examiner—Nam Nguyen
Assistant Examiner—I.-H. Lin
(74) Attorney, Agent, or Firm—Senniger, Powers, Leavitt & Roedel

(57) ABSTRACT

A plunger tip for attachment to the forward end of a plunger rod for forcing molten metal from the shot sleeve into the die of die-casting apparatus. The plunger rod has a threaded socket extending axially inward from its forward end and a tube for coolant extending forward out of its forward end. The plunger tip includes an annular body having a rearward end portion and an integral cylindrical hollow extension. The body has a part-spherical recess. The tip also includes an elongate tubular fitting having a spherical formation seated in sealed relation in the part-spherical recess. In addition, the fitting is held in assembly with the body with the spherical formation in the part-spherical recess by retainer fastened on the rear face of the body. The retainer is formed to provide a part-spherical recess complementary to the above-mentioned part-spherical recess providing a spherical recess having the spherical formation of the fitting therein in sealed relation to the body and retainer. Further, the tip includes a cup-shaped head having an annular wall attached on the extension adapted for sliding sealing engagement with the internal surface of the shot sleeve and a forward end wall spaced forward of the forward end of the extension.

11 Claims, 2 Drawing Sheets

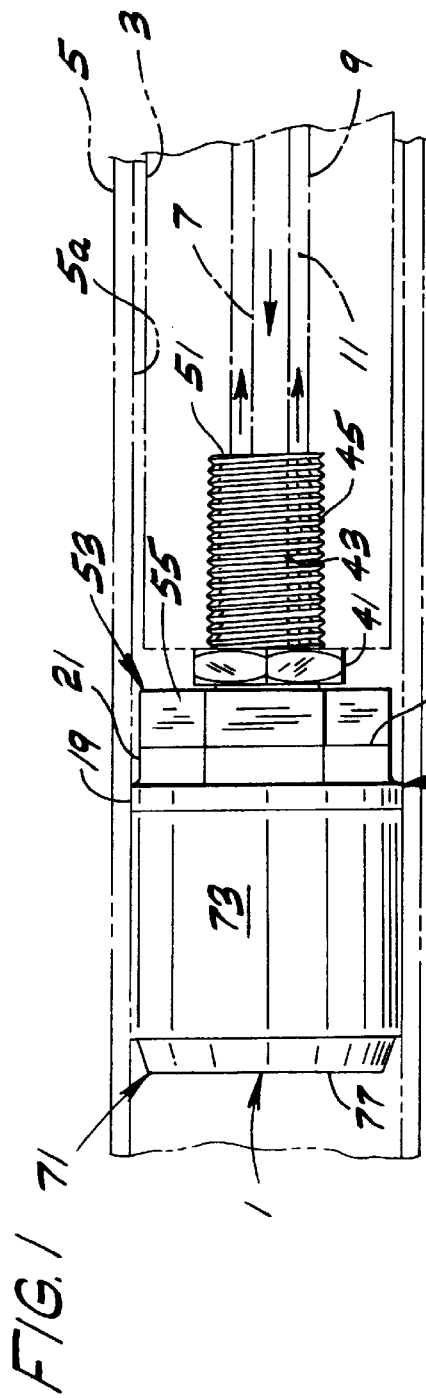
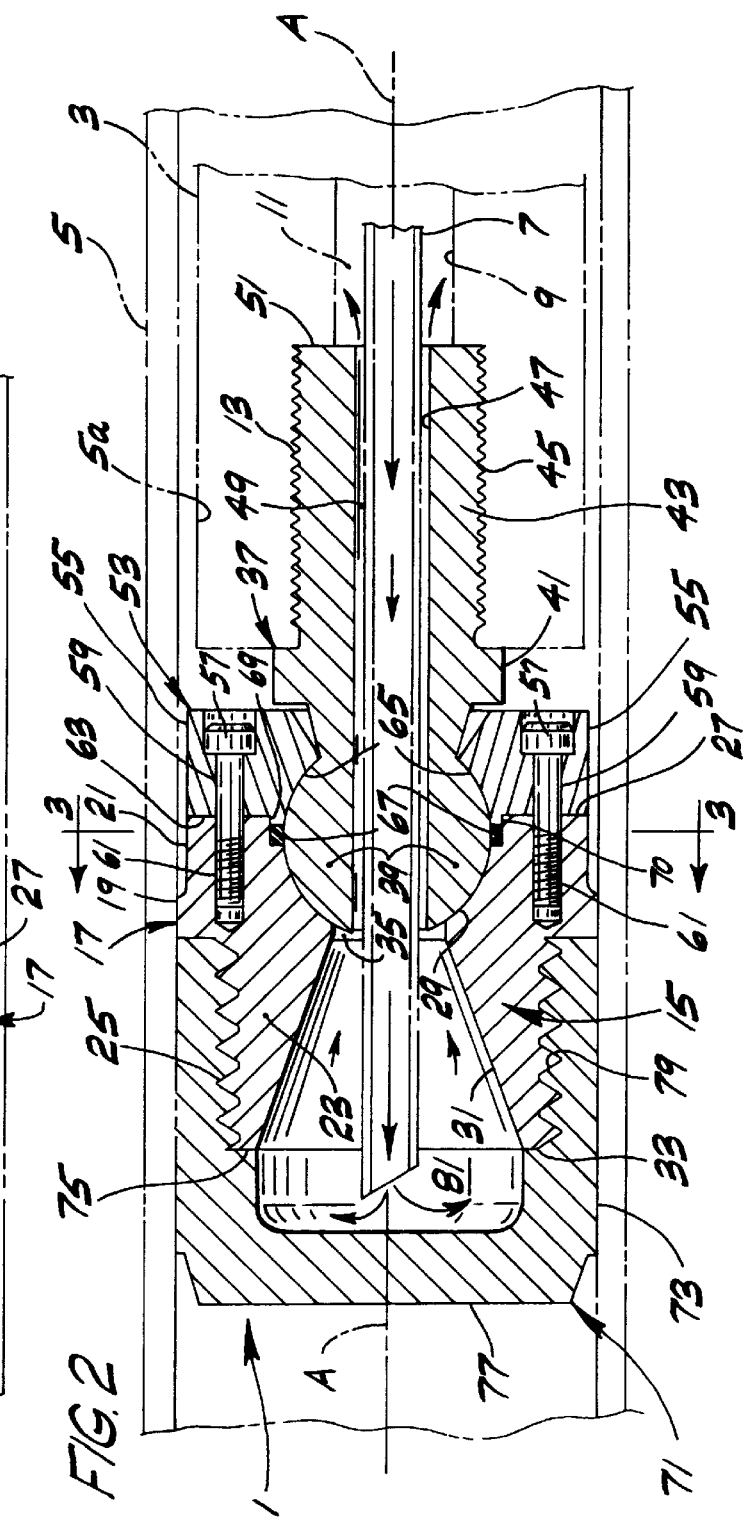

PLUNGER TIP FOR DIE CASTING APPARATUS

BACKGROUND OF THE INVENTION

This invention relates to a plunger tip such as is used in die casting apparatus as a piston at the end of a plunger rod operable in what is termed the shot sleeve of the apparatus for forcing a charge of molten metal out of the sleeve into the die of the apparatus, and more particularly to such a plunger tip which is self-aligning in the sleeve.

Reference may be had to the following U.S. patents for background on plunger tips generally of the class described:

| U.S. Pat. No. | Title | Issue Date |
| --- | --- | --- |
| 4,154,288 | Injection Molding Machine Having Swivel Shot Tip Assembly | May 15, 1979 |
| 4,311,185 | Injection Piston for Die Casting | January 19, 1982 |
| 4,334,575 | Method for Cooling a Plunger Tip in a Die Casting Machine of the Cold Chamber Type and Apparatus Therefor | June 15, 1982 |
| 4,598,762 | Plunger for a Casting Machine | July 8, 1986 |
| 4,667,729 | Shot Tip for Cold Chamber Die Casting Machine | May 26, 1987 |
| 4,754,799 | Process for Die-Casting Aluminum Alloys of Low Iron and High Aluminum | July 5, 1988 |
| 4,842,039 | Self-Aligning Plunger Tip | June 27, 1989 |
| 4,886,107 | Piston for Cold Chamber | December 12, 1989 |
| 4,899,804 | Plunger Tip for Cold Chamber Die Cast Machine | February 13, 1990 |
| 5,076,344 | Die-Casting Process and Equipment | December 31, 1991 |
| 5,370,171 | Die-Casting Process and Equipment | December 6, 1994 |

BRIEF SUMMARY OF THE INVENTION

Among the several objects of the invention may be noted the provision of a plunger tip of the type having ball and socket articulation for misalignment corrections similar to that shown in the above-listed U.S. Pat. No. 4,154,288 and 4,842,039 of improved construction for effecting good cooling of the tip; the provision of such a plunger tip which is economical to manufacture and reliable in operation; and the provision of such a tip with a replaceable head, which may be made of beryllium-copper alloy as in the above-listed U.S. Pat. No. 4,667,729.

In general a plunger tip of this invention is adapted for attachment to the forward end of a plunger rod for forcing molten metal from the shot sleeve into the die of die-casting apparatus. The plunger rod (not a part of this invention) has a threaded socket extending axially inward from its forward end and a tube for coolant extending forward out of its forward end. The tip per se comprises an annular body having a rearward end portion of such peripheral outline as to be reciprocal in the shot sleeve and an integral cylindrical hollow extension extending forward from said rearward end portion coaxial therewith and of smaller peripheral outline. Said rearward end portion has a rear face and said body has a part-spherical recess in said rear face. The hollow of said extension extends from said recess to the forward end of said extension. An elongate tubular fitting having at one end thereof constituting its forward end a spherical formation is seated in sealed relation in said part-spherical recess, said fitting having a part engageable by a tool for turning it rearward of said spherical formation and an externally screw-threaded cylindrical portion rearward of said tool-engageable part for being threaded into said socket of said plunger rod. The fitting, being tubular, has a generally axial bore extending from its rearward end to the hollow of said extension for reception of the said coolant tube of said plunger rod with a space between the external surface of the tube and the internal surface of said bore, and is retained in assembly with the body with said spherical formation in the part-spherical recess by retainer means fastened on the rear face of the body. The retainer means is formed to provide a part-spherical recess complementary to the above-mentioned part-spherical recess thereby providing a spherical recess having the spherical formation of the fitting therein in sealed relation to said body and retainer means. A cup-shaped head is provided having an annular wall attached on said extension adapted for sliding sealing engagement with the internal surface of said shot sleeve and a forward end wall spaced forward of the forward end of said extension.

Other objects and features will be in part apparent and in part pointed out hereinafter.

BRIEF DESCRIPTION OF THE DRAWINGS

FIG. 1 is a view in side elevation of a plunger tip of this invention illustrated as attached to a plunger rod of die casting apparatus reciprocal in a shot sleeve or sleeve of the apparatus, the plunger rod and sleeve being shown in phantom since they do not form parts of the invention;

FIG. 2 is a longitudinal section of the plunger tip on a larger scale than FIG. 1, again showing in phantom the plunger rod and sleeve and also a coolant tube which extends through the tip from the plunger rod;

Corresponding reference characters indicate corresponding parts throughout the views of the drawings.

DETAILED DESCRIPTION

Figure 3:
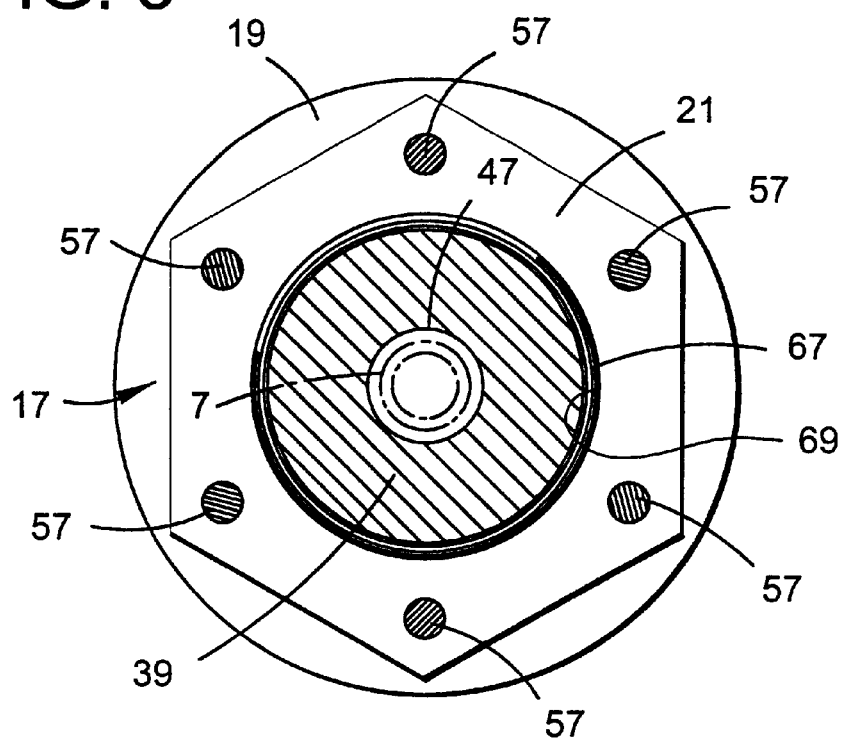
FIG. 3 is a transverse section of the tip per se generally on line 3—3 of FIG. 2.

Referring first primarily to FIGS. 1 and 2 of the drawings, a plunger tip of this invention, designated in its entirety by the reference numeral 1, is shown in its operative mode attached to the forward end of a plunger rod 3 reciprocal in a cylindrical shot sleeve 5 of conventional die casting apparatus, the plunger rod being tubular and having the usual coolant tube 7 extending therethrough and extending forward therefrom for some distance beyond the forward end of the plunger rod. The plunger rod, sleeve and coolant tube are shown in phantom since they do not form part of the invention, being shown to illustrate the background or environment of the invention. It will be understood that the plunger rod, with the tip at its forward end, is driven forward in the shot sleeve, the tip having a sliding sealing fit therein and acting as a piston for forcing molten metal out of the shot sleeve into the die of die-casting apparatus. It will be further understood that coolant, e.g. water, is delivered to the tip through the coolant tube 7 to cool it. The coolant tube is of smaller external cross-section than the bore 9 in the plunger rod through which it extends providing a passage 11 for the reverse flow of the coolant around the tube. The plunger rod has a threaded socket 13 extending axially inward from its forward end for attachment of the tip 1 as will be subsequently described. The plunger tip 1 comprises an annular body 15 having a rearward end portion designated in its entirety by the reference numeral 17 of such peripheral outline as to be reciprocal in the shot sleeve 5. The latter having a circular bore 5a, said rearward end portion 17 has a forward formation 19 of circular outline of such diameter as to have a relatively close sliding fit in the shot sleeve and an integral rearward formation 21 of polygonal and more specifically hexagonal outline. The body 15 has an integral cylindrical externally threaded hollow extension 23 extending forward from the said rearward end portion 17 of the body 15 coaxial therewith and of smaller peripheral outline than rearward end portion 17 (smaller external diameter than the diameter of the circular forward formation 19). The external threading of extension is indicated at 25. The rearward end portion 17 of the body 15 has a rear face 27, more particularly a flat rear face, and the body has a part-spherical recess 29, more particularly a hemispherical recess, in said rear face. The hollow 31 of the externally threaded extension 23 extends from recess 29 to the forward end 33 of the extension, being primarily of conical or tapered form divergent generally from the recess to the forward end. As shown it has a very short cylindrical rear end portion 35 (the small diameter end of the hollow 31) coming off the recess 29.

Figure 4:
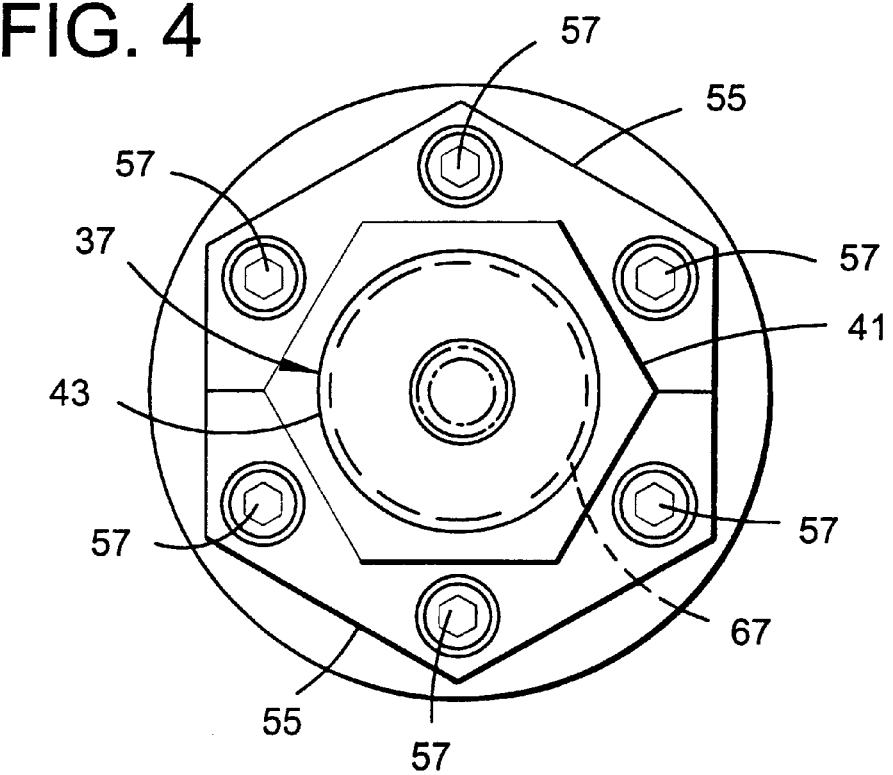
FIG. 4 is an end view of the tip per se as viewed from its right end in FIG. 2.

An elongate tubular fitting designated in its entirety by the reference numeral 37 has at one end thereof constituting its forward end a spherical formation or ball end 39 seated in sealed relation in the hemispherical recess 29. Rearward of and adjacent the spherical formation or ball 39 the fitting 37 has a part, more particularly a hexagonal head 41, engageable by a tool (e.g., a wrench) for turning it. Rearward of this part or head 41, the fitting 37 has an externally screw-threaded cylindrical portion or shank 43 for being threaded into the socket 13 of said plunger rod 3 by turning the fitting, e.g., with a wrench. The screw thread on the shank is designated 45. Although a male screw thread 45 is shown in the drawings, the shank 43 may have a female thread without departing from the scope of the present invention. As noted above and shown in FIGS. 2–4, the fitting is tubular, the bore or passage therethrough being indicated at 47, and being of larger diameter than the external diameter of the coolant tube 7, which extends through said bore 47 and through the conic hollow 31 of the body 15, projecting slightly forward of the forward end 33 of the body when the tip 1 is attached to the plunger rod 3. With the bore 47 of larger diameter than the external diameter of the coolant tube 7, there is an annular space or passage 49 in the fitting all the way from the conic hollow 31 to the rearward end 51 of the fitting between the external surface of the tube 7 and the internal surface of bore 47 for exit of coolant as will be described.

The fitting 37 is held in assembly with the body 15 with the spherical formation or ball 39 of the forward end of the fitting in the hemispherical recess 29 in the rearward end of the body by retaining means indicated in its entirety by the reference numeral 53 fastened on the rear face 27 of the body 15. The retaining means 53 comprises two retainers, each designated 55 (they are identical) and each comprising a half-hexagon shaped piece fastened on the rear face 27 of the body by screws 57 extending through holes 59 in the pieces threaded in tapped holes 61 in the rearward end portion 17 of body 15 extending forward from the rear face parallel to the axis A of the tip 1. Each half-hexagon shaped retainer 55 has a flat forward face 63 engaging the flat rear face 27 of portion 17 of the body 15 with a recess 65 formed in said face 63 as one-quarter of a sphere. The two one-quarter of a sphere recesses, in the relation of the retainers as assembled with the body 15, mate to constitute a hemispherical recess complementary to the hemispherical recess 29 providing a spherical recess 29,65 having the spherical formation or ball 39 of fitting 37 therein. The ball not only has a close fit in the spherical recess for holding it in sealed relation therein with the body 15 articulated thereon, but also a sealing ring 67 is provided lodged in a groove 69 surrounding the ball 39 at the interface 27, 63 formed by grooving the hexagonal formation 21 and the retainers around the recess 65 therein. This single sealing ring 67 has the dual function of sealing against the ball 39 and sealing said interface 27, 63. A raised rim 70 surrounding the recess 65 engages the groove 69 to hold the retainers 55 together and to maintain the hemispherical shape of the recess 65.

A cup-shaped head 71, preferably formed of a beryllium-copper alloy, has an annular wall 73 with a rear-facing internal shoulder 75 and a forward end wall 77 spaced forward of the shoulder. Although the wall 73 may have other dimensions without departing from the scope of the present invention, the wall 73 of the preferred embodiment has a diameter between about two inches and about four inches selected to match the particular shot sleeve 5 with which the tip 1 is used. The annular wall is internally screw-threaded as indicated at 79 rearward of the shoulder 75 and is threaded on the extension 23 of body 15 to the point of engagement of the shoulder with the forward end 33 of the extension 23. This locates the forward end wall 77 of the head forward of the forward end of extension 23 and forward of the forward end of coolant tube 7 extending from the plunger rod 3 through bore 47 of the plunger tip 1 in the plunger rod-plunger tip assembly (see FIG. 2) in which shank 43 of the plunger tip is threaded in the socket 13 therefor of the plunger rod 3. The head is dimensioned for sliding sealing engagement with the internal surface of the shot sleeve 5.

Thus, the body 15 with head 71 thereon (attached to the forward end of plunger rod 3) is articulated on fitting 37 by means of the ball and socket mount for self-alignment thereof in the shot sleeve 5 (stated another way, for misalignment correction). Coolant flowing through the coolant tube 7 in the direction of the arrows shown in the tube exits the forward end of the coolant tube into the chamber 81 in head 71 for direct heat-exchange relation with the forward end wall 77 of the head and that part of the annular wall 73 of the head forward of shoulder 75, and flows back around the coolant tube through the conic hollow 31 to the annular passage 49 returning to the plunger rod, functioning for heat-exchange relation with extension 23 and parts rearward thereof. This achieves good cooling. The construction enables manufacture with low tolerances for the ball and sockets, and the use of a single O-ring for sealing. The head 71 is readily removable and replaceable, as may be needed.

In view of the above, it will be seen that the several objects of the invention are achieved and other advantageous results attained.

As various changes could be made in the above constructions without departing from the scope of the invention, it is intended that all matter contained in the above description and shown in the accompanying drawings shall be interpreted as illustrative and not in a limiting sense.

What is claimed is:

1. A plunger tip for attachment to the forward end of a plunger rod for forcing molten metal from a shot sleeve into a die of die-casting apparatus, said plunger rod having a threaded socket extending axially inward from its forward end and a tube for coolant extending forward out of its forward end, said plunger tip comprising:

an annular body having a rearward end portion of such peripheral outline as to be reciprocal in the shot sleeve, an integral cylindrical hollow extension extending forward from said rearward end portion coaxial therewith and of smaller peripheral outline, said rearward end portion having a rear face, said body having a part-spherical recess in said rear face, the hollow of said extension extending from said recess to the forward end of said extension, an elongate tubular fitting having at one end thereof constituting its forward end a spherical formation seated in sealed relation in said part-spherical recess, said fitting having a part engageable by a tool for turning it rearward of said spherical formation and an externally screw-threaded cylindrical portion rearward of said tool-engageable part for being threaded into said socket of said plunger rod, said fitting, being tubular, having a generally axial bore extending from its rearward end to the hollow of said extension for reception of the said coolant tube of said plunger rod with a space between an external surface of the tube and an internal surface of said bore, said fitting being held in assembly with said body with said spherical formation in said part-spherical recess by retainer means fastened on the rear face of the body, said retainer means being formed to provide a part-spherical recess complementary to and facing the above-mentioned part-spherical recess of the body such that the part-spherical recess of the body and the part-spherical recess of the retainer means together form a spherical recess having the spherical formation of the fitting therein, and a cup-shaped head having an annular wall attached on said extension adapted for sliding sealing engagement with an internal surface of said shot sleeve and a forward end wall spaced forward of the forward end of said extension.

2. A plunger tip as set forth in claim 1 wherein said head is a beryllium-copper alloy head having its annular wall threaded on said extension.

3. A plunger tip as set forth in claim 1 wherein the retainer means comprises a plurality of retainers fastened by screws on the rear face of the body, each retainer having a forward face engaging the rear face of the body, each retainer having a part-spherical recess in its forward face, said part-spherical recesses in the retainers together forming the part-spherical recess of the retainer means.

4. A plunger tip as set forth in claim 3 wherein the recess in the rear face of the body is hemispherical and the recesses in the forward faces of the retainers are in the form of one-quarter of a hemisphere together forming a hemispherical recess providing with the hemispherical recess in the rear face of the body said spherical recess having said spherical formation therein.

5. A plunger tip as set forth in claim 4 having a sealing ring in sealing engagement with said spherical formation around said spherical formation and also sealing the interface between the rear face of the body and the forward faces of said retainers.

6. A plunger tip as set forth in claim 1 wherein the annular wall of the head has an internal annular shoulder facing rearward between its forward end wall and its rearward end and is threaded on said extension to the point of engagement of said shoulder with the forward end of said extension.

7. A plunger tip as set forth in claim 6 wherein the hollow in said extension is conic divergent from the recess in the body to the forward end of the extension.

8. A plunger tip as set forth in claim 7 wherein said part engageable by a tool comprises a hexagonal head.

9. A plunger tip as set forth in claim 8 wherein the retainer means comprises a plurality of retainers fastened by screws on the rear face of the body, each retainer having a forward face engaging the rear face of the body, each retainer having a part-spherical recess in its forward face, said part-spherical recesses in the retainers together forming the part-spherical recess of the retainer means.

10. A plunger tip as set forth in claim 9 wherein the recess in the rear face of the body is hemispherical and the recesses in the forward faces of the retainers are in the form of one-quarter of a hemisphere together forming a hemispherical recess providing with the hemispherical recess in the rear face of the body said spherical recess having said spherical formation therein.

11. A plunger tip as set forth in claim 10 having a sealing ring in sealing engagement with said spherical formation around said spherical formation and also sealing the interface between the rear face of the body and the forward faces of said retainers.

\* \* \* \* \*